United States Patent [19]

Rademaker

[11] 4,166,196

[45] Aug. 28, 1979

[54] ELECTRIC DIRECT CURRENT TELEGRAPHY TRANSMITTER

[75] Inventor: Gerrit Rademaker, Hilversum, Netherlands

[73] Assignee: U.S. Philips Corporation, New York, N.Y.

[21] Appl. No.: 895,984

[22] Filed: Apr. 13, 1978

[30] Foreign Application Priority Data

Apr. 29, 1977 [NL] Netherlands ................ 7704703

[51] Int. Cl.² ........................................ H04L 15/00
[52] U.S. Cl. ........................................ 178/68; 178/3
[58] Field of Search ............. 178/68, 70 R, 3, 69 A, 178/69 G, 69 R; 179/170 NC, 77; 307/236, 270; 328/162, 164

[56] References Cited

U.S. PATENT DOCUMENTS

| | | | |
|---|---|---|---|
| 3,671,671 | 6/1972 | Watanabe | 178/68 |
| 3,835,252 | 9/1974 | Ananiades et al. | 178/68 |
| 3,851,098 | 11/1974 | Pingault | 178/68 |
| 3,970,944 | 7/1976 | Huellwegen | 178/69 A |
| 4,092,489 | 5/1978 | Birlmeier | 178/3 |

Primary Examiner—Thomas A. Robinson
Attorney, Agent, or Firm—Thomas A. Briody; William J. Streeter; Simon L. Cohen

[57] ABSTRACT

An electronic transmitter for direct current telegraphy by means of polar line currents has a switching circuit that selectively connects one of the two poles of a telegraphy battery through a unipolar constant current source to a telegraph line, and an output filter having a capacitor in parallel with the telegraph line. The higher frequencies in the telegraphy signals are sufficiently suppressed to keep the noise level in adjacent telephone lines below a prescribed value because the output filter also has two complementary branches in parallel with the telegraph line, at least one of the two branches supplying, in response to a polarity transition of the line current supplied by the current source, a correction pulse having a polarity opposite to the line current to the telegraph line. This output filter is assembled from small-sized, low-priced elements so that an efficient miniaturization of the electronic transmitter in its entirety can be realized.

4 Claims, 12 Drawing Figures

ELECTRIC DIRECT CURRENT TELEGRAPHY TRANSMITTER

BACKGROUND OF THE INVENTION

1. Field of the Invention

The invention relates to an electronic transmitter for direct current telegraphy systems in which binary data signals are converted into polar line currents for transmission over a telegraph line, the transmitter comprising an input circuit generating command signals from the data signals which are galvanically isolated therefrom, a telegraph voltage source having a positive and a negative pole, a unipolar constant current source, a switching circuit controlled by the command signals for selectively connecting one of the two poles of the telegraph voltage source to the telegraph line through the unipolar constant current source, and an output filter having a capacitor in parallel with the telegraph line.

In the systems for polar direct current telegraphy (also called double-current telegraphy) the formerly generally used transmitters with mechanical telegraph relays are replaced to an increasing extent by transmitters having electronic telegraph relays which offer considerable advantages as regards life, space occupied and price.

If such electronic telegraph transmitters are constructed in the manner mentioned above, they have the additional advantage that they can be used in both current-controlled and in voltage-controlled telegraphy systems. When using these transmitters in current-controlled systems in which the telegraph signals at the input of the telegraph line are defined as currents having a prescribed value (for example 20 mA) and in which the input impedance of the receiver is made as low as possible, the constant current source is adjusted to the prescribed current value. When these transmitters are used in voltage-controlled systems in which the telegraph signals at the input of the telegraph line are defined as voltages having a prescribed value (for example not more than 5 volts less than the telegraphy battery voltage of 80 volts) and in which the input impedance of the receiver is made as large as practically possible, the constant current source is, on the contrary, adjusted to such a high current value (for example 50 mA) that the impedance of telegraph line and receiver together always determine the current at the receiver side and the current source consequently acts as current limiter only.

An important problem which must also get attention when using electronic telegraph transmitters, is crosstalk from the telegraph signals to adjacent transmission lines. Particularly with adjacent telephone lines the interference caused by crosstalk is annoying because it is within the speech frequency band and, consequently, audible. Therefore most telecommunication administrations impose stringent requirements on the level of this type of interference. Since crosstalk increases with frequency the higher frequencies in the telegraph signals should be suppressed to keep the crosstalk interference within acceptable limits.

2. Description of the Prior Art

The networks which were generally used in the past and which are still used with known electronic telegraph transmitters for suppressing the higher frequencies in the telegraph signals, are LC-filters having two series coils and a parallel capacitor or a series coil and two parallel capacitors. In view of the customary telegraph speeds the cut-off frequencies of these LC-filters are rather low, so that the required coils are bulky and therefore considerably limit the possibilities for miniaturisation of the electronic telegraph transmitters.

United Kingdom Pat. Specification No. 1,209,988 discloses the replacement of LC-filters for suppressing higher frequencies in polar signals with substantially instantaneous transitions by a circuit without coils, which circuit comprises a first operational amplifier having such a feedback circuit that the first amplifier supplies an output signal having a substantially linear slope characteristic in response to a transition in the polar signals, and a second operational amplifier having such a feedback circuit that the second amplifier supplies an output signal having a substantially sinusoidal slope characteristic in response to an output signal of the first amplifier. The operation of this circuit is mainly based on the differences in shape of the non-linear current-to-voltage characteristics of silicon diodes and germanium diodes, respectively in the transition range between their conducting and non-conducting states.

Apart from the fact that such a pronounced dependency on the properties of non-linear elements is usually unwanted for practical reasons, the use of this prior art circuit in electronic telegraph transmitters would require drastic changes in the existing transmitter structure which in addition are accompanied by a considerable increase in the number of elements and the power consumption, as this circuit is not suitable for processing the high current and voltage values of the telegraph signals at the transmitter output and, consequently, cannot be applied in the same place as the LC-filters.

Furthermore, it has already been proposed to miniaturize electronic telegraph transmitters by eliminating the coils in the existing LC-filters. However, it then appears that the suppression of the higher frequencies in the telegraph signals is insufficient for keeping the crosstalk interference in adjacent telephone lines within acceptable limits.

SUMMARY OF THE INVENTION

It is an object of the invention to provide an electronic telegraph transmitter of the type set forth, having an output filter which adequately suppresses the higher frequencies in the telegraph signals to keep the interference level in adjacent telephone lines below the prescribed value and which, nevertheless, is assembled from a small-sized and low-priced components only so that it is possible to realize an efficient miniaturization of the transmitter in its entirety.

The electronic telegraph transmitter according to the invention is characterized in that the output filter also comprises two complementary branches in parallel with the telegraph line, at least one of the two branches in response to a polarity transition of the line current supplied by the current source supplying a correction current pulse of a polarity opposite to the line current to the telegraph line.

BRIEF DESCRIPTION OF THE DRAWINGS

Some embodiments of the invention and their advantages will now be further explained with reference to the drawings, in which.

DESCRIPTION OF THE EMBODIMENTS

General Description

Figure 1:
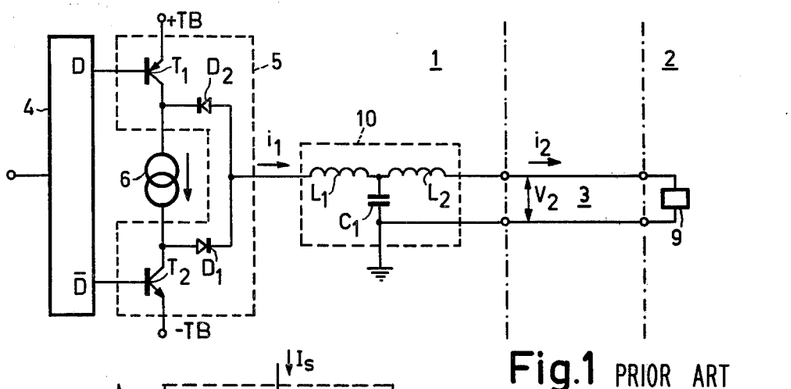
FIG. 1 shows a block diagram of a direct current telegraphy system with a prior art electronic transmitter.

FIG. 1 shows the block diagram of a known system for polar direct current telegraphy having an electronic transmitter 1, in which binary data signals are converted into telegraph signals which are transmitted in the form of polar line currents to a receiver 2 over a telegraph line 3.

As the current and voltage values of the binary data signals and those of the telegraph signals are within totally different ranges, these signals are galvanically isolated from one another in transmitter 1. To this end transmitter 1 comprises an input circuit 4 for generating from the data signals complementary command signals D and $\overline{D}$, which are galvanically isolated from the data signals with the aid of known means, such as transformers or opto-electronic coupling elements. These command signals D, $\overline{D}$ control a switching circuit 5 which, depending on the binary value of the data signals, connects the positive pole +TB or the negative pole −TB of a telegraph battery to telegraph line 3 through a unipolar constant current source 6. In FIG. 1 switching circuit 5 comprises two complementary transistors $T_1$, $T_2$ and two diodes $D_1$, $D_2$, one end of the current source 6 being connected to positive pole +TB through transistor $T_1$ and to telegraph line 3 through diode $D_2$ and the other end of current source 6 being connected to negative pole −TB through transistor $T_2$ and to telegraph line 3 through diode $D_1$.

If command signal D assumes its low value for a binary value "1" of the data signals and, consequently, command signal $\overline{D}$ its high value, transistor $T_1$ and diode $D_1$ are in their conducting state and transistor $T_2$ and diode $D_2$ in their non-conducting state so that a positive line current $i_1$ flows from positive pole +TB through transistor $T_1$, current source 6 and diode $D_1$ to telegraph line 3. For a binary value "0" of the data signals transistor $T_1$ and diode $D_1$ are then in their non-conducting state and transistor $T_2$ and diode $D_2$ in their conducting state, so that a negative line current $i_1$ flows from negative pole −TB through transistor $T_2$, current source 6 and diode $D_2$ to telegraph line 3.

Compared to conventional electro-mechanical transmitters, the electronic transmitter 1 shown in FIG. 1 is not only attractive because bulky and expensive elements such as mechanical telegraph relays and associated spark quench circuits are missing, but also because the use of constant current source 6 makes certain additional measures superfluous in these conventional transmitters, such as ballast lamps for protecting the telegraph battery from short-circuits in telegraph line 3 or adjustable resistors for setting the line current to its prescribed value.

Figure 2:
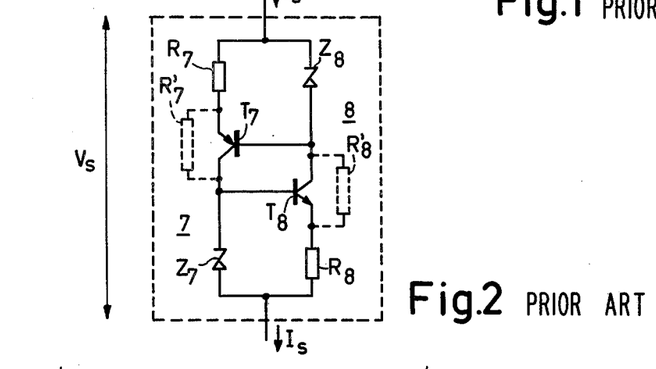
FIG. 2 shows an embodiment of a unipolar constant current source suitable for use in the transmitter of FIG. 1.

Although other constructions are possible, unipolar constant current source 6 in FIG. 1 is preferably constructed in the manner shown in FIG. 2 and already known per se from, for example, "VALVO Technische Information fur die Industrie", Nr. 132, August 1969. Current source 6 in FIG. 2 consists of two parallel branches 7 and 8, wherein, viewed in the direction of the supplied current $I_s$, branch 7 successively comprises a resistor $R_7$, the emitter-collector path of a pup transistor $T_7$ and a zener diode $Z_7$, and branch 8 successively a zener diode $Z_8$, the collector-emitter path of an npn transistor $T_8$ and a resistor $R_8$. Furthermore, zener diodes $Z_8$, $Z_7$ supply the base voltages for transistors $T_7$, $T_8$. In branch 7 the current through zener diode $Z_7$ is substantially equal to the emitter current of transistor $T_7$, the latter current being exclusively determined by the zener voltage $V_Z$ of diode $Z_8$ in branch 8, the base-emitter voltage $V_{BE}$ of transistor $T_7$ and the value R of resistor $R_7$ in branch 7. This means that the current through branch 7 is independent of the voltage $V_s$ across current source 6. The same reasoning applies to the current through branch 8 and, consequently, also to the total current $I_s$ supplied by current source 6. To limit the dissipation per transistor the currents through both branches 7, 8 are made euqal to one another by means of a suitable choice of the resistors $R_7$, $R_8$. The total current $I_s$ than amount to $$I_s = 2(V_z - V_{BE})/R$$

and is independent of the voltage $V_s$ across current source 6. It is then assumed as a matter of fact that the voltage $V_s$ exceeds the so-called knee voltage $V_K$, the value of $V_s$ for which the circuit in FIG. 2 can still just function as current source. For the construction shown in FIG. 2 this knee voltage $V_K$ is, in a reasonable approximation, equal to $2V_Z$. If a very low knee voltage $V_K$ is desired, each of the zener diodes $Z_7$, $Z_8$ in FIG. 2 can be replaced by the series arrangement of two silicon diodes in the pass direction; $V_K$ is then, in a reasonable approximation, equal to $4V_F$, the forward voltage $V_F$ of a silicon diode being approximately one order of magnitude lower than the zener voltage $V_Z$ of a zener diode. If a further limitation of the transistor dissipation is desired, the emitter-collector path of each of the transistors $T_7$, $T_8$ can be shunted by a resistor $R'_7$, $R'_8$ which is shown in FIG. 2 by means of a dotted line; in addition, these resistors $R'_7$, $R'_8$ guarantee the automatic starting of current source 6 when voltage $V_s$ is switched on.

The described electronic transmitter can be used in both current-controlled and in voltage-controlled telegraphy systems.

In current-controlled systems the telegraph signals at the input of telegraph line 3 are defined as currents which (after the transient phenomena have ended) have a prescribed value, for example 20 mA. The input of receiver 2 is then constituted by a polar relay 9 having an impedance which is as low practically possible on the basis of the required sensitivity at the prescribed current value. If the described transmitter is used in such current-controlled systems, current source 6 of FIG. 2 is adjusted by a suitable rating of resistors $R_7$, $R_8$ so that the supplied current $I_s$ has this prescribed value. As in these current-controlled systems the voltage $V_s$ across current source 6 is always much larger than the knee voltage $V_K$, current source 6 functions continuously as a substantially ideal current source.

In voltage controlled systems the telegraph signals at the input of telegraph line 3 are defined as voltages which (after the transition phenomena have ended) have a prescribed value, for example at least 75 volts at a telegraph battery voltage of 80 volts. The input of receiver 2 is again constituted by a polar relay 9 which is now, however, connected to telegraph line 3 through a series resistor (not shown in FIG. 1) having a sufficiently high value to limit the received current for all customary lengths of telegraph lines 3 to values which are compatible with the sensitivity of polar relay 9, a compromise value frequently used in practice for this series resistor being 4 k$\Omega$. If the described transmitter is used in such voltage-controlled systems, current source 6 of FIG. 2 is adjusted by a suitable rating of resistors $R_7$, $R_8$ to such a high current value $I_s$ that in all circumstances the current at the receiving side is determined by the voltage at the input of telegraph line 3 and the impedance of telegraph line 3 and receiver 2 together; this current value $I_s$ is, for example, 50 mA. However, in these voltage-controlled systems the voltage $V_s$ across current source 6 only exceeds the knee voltage $V_K$ during a polarity transition, but during the remaining period of time it is smaller, so that current source 6 actually functions as a current limiter which supplies during a polarity transition a constant current with the preset value $I_s$ and which supplies during the remaining period of time a current whose value is determined at a given telegraph battery voltage by the total series resistance of telegraph line 3 and receiver 2.

In the described electronic transmitter attention should, however, also be paid to the crosstalk disturbance in adjacent telephone lines caused by signals in telegraph line 3. In order to reduce the level of this crosstalk interference, the polar line current supplied by current source 6 is applied to telegraph line 3 through an output filter 10. In many known telegraphy systems, output filter 10 comprises two series coils $L_1$, $L_2$ and a parallel capacitor $C_1$. The cut-off frequency of such a LC filter 10 is indeed chosen a factor of 1.5 to 2 greater than the frequency corresponding to the telegraph speed, but for the still generally used telegraph speed of 50 Baud this cut-off frequency is so low that notably the coils $L_1$, $L_2$ demand much space and are, in addition, expensive. A still frequently used LC-filter 10 having the values $L_1=L_2=1$ H and $C_1=2.2$ $\mu$F and having a volume of approximately 500 cm$^3$, even when modern manufacturing techniques are used, may serve as an example.

As the large volume of the output filter 10 in FIG. 1 is the most important obstacle for a miniaturization of transmitter 1 and this volume is substantially fully determined by the coils $L_1$, $L_2$, it has already been proposed to miniaturize transmitter 1 by omitting the series coils $L_1$, $L_2$ of output filter 10. It appears, however, that such an output filter 10, which only comprises a parallel capacitor $C_1$ and, consequently, demands little space, does not sufficiently suppress the higher frequencies in the telegraph signals to keep crosstalk interference in adjacent telephone lines within acceptable limits. The signal shapes of the voltages and the currents occurring in various points of transmitter 1 in FIG. 1 if an output filter 10 having a parallel capacitor $C_1$ only is used are schematically shown in FIG. 3 and FIG. 4 for current-controlled and voltage-controlled systems, respectively.

Figure 3:
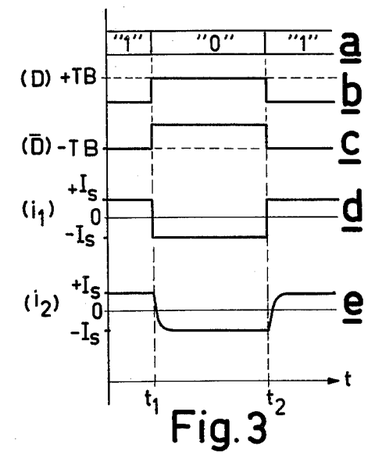
FIG. 3 and FIG. 4 show some time diagrams for explaining the operation of the transmitter in FIG. 1.
Figure 4:
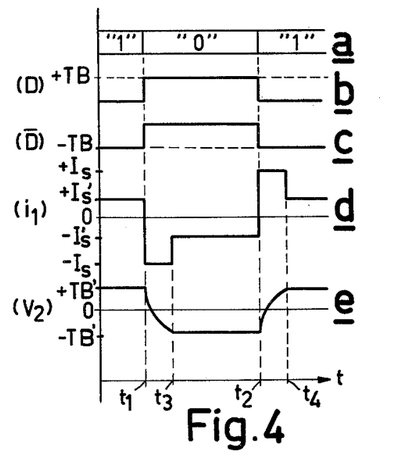

In FIG. 3 and FIG. 4 time diagram a shows the binary data signal to be transmitted, time diagram b shows the associated command signal D with +TB as reference and time diagram c shows the associated command signal $\overline{D}$ with −TB as reference, TB being, for example, 80 volts. In addition, time diagram d shows the polar line current $i_1$ as supplied by current source 6 which is adjusted to $I_s$, $I_s$ in FIG. 3 being equal to the prescribed steady-state value of, for example, 20 mA and Is in FIG. 4 having a value of, for example, 50 mA; FIG. 4 also shows the steady-state value $I_s'$ of current $i_1$ which depends on the total series resistance of telegraph line 3 and receiver 2 and which must always be lower than the value $I_s$. Time diagram e in FIG. 3 shows the current $i_2$ at the input of telegraph line 3 and its prescribed steady-state value $I_s$. Time diagram e in FIG. 4 shows the voltage $V_2$ at the input of telegraph line 3 and its steady-state value TB' which is not more than a prescribed amount of, for example, 5 volts lower than TB.

From diagram e in FIG. 3 it appears that current $i_2$ at the instants $t_1$ and $t_2$ of the polarity transitions of current $i_1$ has a discontinuous derivative. It also appears from diagram e in FIG. 4 that voltage $V_2$ has a discontinuous derivative at the instants $t_1$ and $t_2$ of the polarity transitions of currents $i_1$ and, furthermore, at the instants $t_3$ and $t_4$, at which voltage $V_2$ attains after a transition its steady-state value TB' (and, consequently, current $i_1$ its steady-state value $I'_s$). As known from the Fourier analysis, it is just these discontinuities which are responsible for the occurrence of higher frequencies in the telegraph signals and, consequently, for the crosstalk to adjacent telephone lines, as this increases with increasing frequency.

Figure 5:
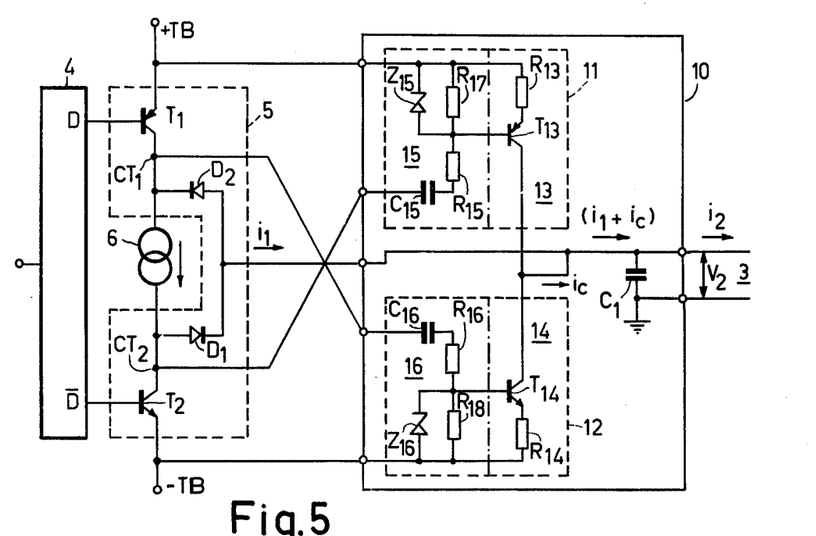
FIG. 5 shows a circuit diagram of a first embodiment of an electronic transmitter according to the invention.

Description of FIG. 5

FIG. 5 shows the circuit diagram of a first embodiment of an electronic transmitter for polar direct current telegraphy according to the invention, Elements in FIG. 5 which correspond to elements in FIG. 1 have been given the same reference numerals in FIG. 5 as in FIG. 1.

In this first embodiment output filter 10 comprises, next to the parallel capacitor $C_1$ already mentioned, also two complementary branches 11 and 12 in parallel with telegraph wire 3, and in response to a polarity transition of the line current $i_1$ supplied by current source 6, at least one of the two branches 11, 12 supplies a correction current pulse $i_c$ having a polarity opposite to the line current $i_1$, to telegraph line 3. More in particular, each of the two complementary branches 11, 12 comprises a controllable auxiliary current source 13, 14 for supplying the correction current pulse $i_c$ and a control circuit 15, 16 which derives a voltage jump, coinciding with a polarity transition of line current $i_1$, from switching circuit 5 and which comprises a differentiating network and a limiter for supplying a limited differentiated voltage jump as a control pulse for auxiliary current source 13, 14.

In FIG. 5 auxiliary current source 13 is constituted by a pnp transistor $T_{13}$, whose emitter is connected through a resistor $R_{13}$ to positive pole +TB whose collector is connected to telegraph line 3; likewise auxiliary current source 14 is constituted by an npn transistor $T_{14}$, whose emitter is connected through a resistor $R_{14}$ to negative pole $-TB$ and whose collector is connected to telegraph line 3. In addition, in FIG. 5 the input of control circuit 15 is connected to the collector of transistor $T_2$ in switching circuit 5 and likewise the input of control circuit 16 is connected to the collector of transistor $T_1$ in switching circuit 5. In control circuit 15, the differentiating network is formed by the series arrangement of a capacitor $C_{15}$ and two resistors $R_{15}$, $R_{17}$ between the input and positive pole $+TB$ and the limiter is constituted by a zener diode $Z_{15}$ in parallel with resistor $R_{17}$; the junction of resistors $R_{15}$, $R_{17}$ in control circuit 15 is connected to the base of transistor $T_{13}$ in auxiliary current source 13. Likewise, the differentiating network in control circuit 16 is formed by the series arrangement of a capacitor $C_{16}$ and two resistors $R_{16}$, $R_{18}$ between the input and negative pole $-TB$ and the limiter is constituted by a zener diode $Z_{16}$ in parallel with the resistor $R_{18}$; the junction of resistor $R_{16}$, $R_{18}$ in control circuit 16 is connected to the base of the transistor $T_{14}$ in auxiliary current source 14.

Operation of the transmitter of FIG. 5

The operation of the transmitter of FIG. 5 is given for applications in current-controlled and in voltage-controlled telegraphy systems.

If the transmitter of FIG. 5 is used in current-controlled telegraphy systems, current source 6 is adjusted to the prescribed steady-state value $I_s$ of the current $i_2$ at the input of telegraph line 3; in this case $I_s$ amounts to, for example, 20 mA. The signal shapes of the voltages and currents occurring in this case in various points of the transmitter of FIG. 5 are shown schematically in the time diagrams of FIG. 6.

Figure 6:
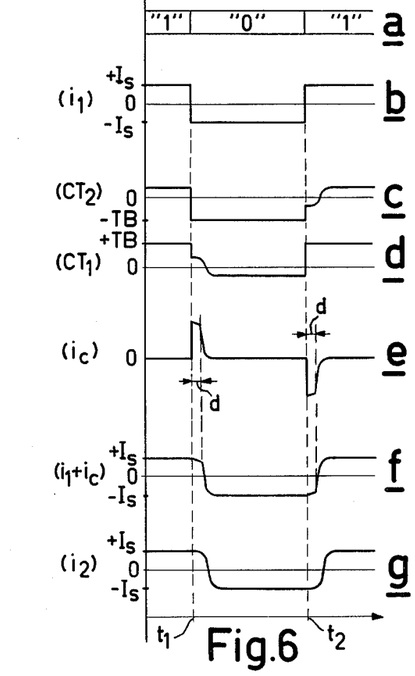
FIG. 6 and FIG. 7 show some time diagrams for explaining the operation of the transmitter in FIG. 5.

In FIG. 6 the binary data signal to be transmitted is indicated by a and the polar line current $i_1$, then supplied in response to data signal a is shown at b (cf. the time diagrams a and b in FIG. 3). This line current $i_1$ has a positive value $+I_s$ for $t < t_1$, a negative value $-I_s$ for $t_1 < t < t_2$ and again a positive value $+I_s$ for $t_2 < t$. The voltages $CT_2$ and $CT_1$ as shown at c and d respectively then appear at the collector of transistor $T_2$ and $T_1$ in switching circuit 5. These voltages $CT_2$ and $CT_1$ present jumps at the instants $t = t_1$ and $t = t_2$ of the polarity transitions of the line current $i_1$ supplied by current source 6, which voltage jumps are used for controlling auxiliary current sources 13 and 14.

Particularly $CT_2$ presents a negative jump at the instant $t = t_1$, at which line current $i_1$ changes from its positive value $+I_s$ to its negative value $-I_s$. For, shortly before $t = t_1$ diode $D_1$ conducts, but transistor $T_2$ is non-conducting, so that $CT_2$ then has a positive value which is substantially equal to the positive steady-state value of voltage $V_2$ at the input of telegraph line 3. (this steady-state value is not fixed in current-controlled systems, but is, in practice, considerably lower than $+TB$). On the contrary, shortly after $t = t_1$ transistor $T_2$ conducts but diode $D_1$ is non-conducting, so that $CT_2$ then has a negative value which is substantially equal to $-TB$. In control circuit 15 of branch 11 the negative voltage jump of $CT_2$ at $t = t_1$ is differentiated and limited to the zener voltage of diode $Z_{15}$, whereafter the control pulse thus obtained is applied to the base of transistor $T_{13}$ of auxiliary current source 13. In response to this control pulse transistor $T_{13}$ then supplies a positive correction current pulse $i_c$ of the same shape as the control pulse. The value of this positive correction current pulse $i_c$ at $t = t_1$ is adjusted by means of resistor $R_{13}$ to approximately $2I_s$, the value of the jump in line current $i_1$ at $t = t_1$.

This correction current pulse $i_c$ which is supplied by branch 11 of output filter 10 in response to the polarity transition of line current $i_1$ at the instant $t = t_1$ is shown at e in FIG. 6. From the instant $t = t_1$ to the instant $t = t_1 + d$, at which the differentiated voltage jump of $CT_2$ in control circuit 15 becomes smaller than the zener voltage of diode $Z_{15}$, the correction pulse $i_c$ has a value which deviates only slightly from $+2I_s$ (this deviation is caused by the non-ideal behavior of zener diode $Z_{15}$); after the instant $t = t_1 + d$ the value of correction current pulse $i_c$ decreases exponentially with a time constant determined by differentiating network $C_{15}$, $R_{15}$, $R_{17}$ in control circuit 15.

In view of the symmetry of switching circuit 15 as well as output filter 10 the above considerations apply *mutatis mutandis* also to the voltage $CT_1$ and the current correction pulse $i_c$ supplied by branch 12, so voltage $CT_1$ shows at the instant $t = t_2$ at which line current $i_1$ changes from its negative value $-I_s$ to its positive value $+I_s$, a positive voltage jump from which control circuit 16 of branch 12 generates a control pulse for transistor $T_{14}$ of auxiliary current source 14 which, in response to this control pulse, supplies a negative correction current pulse $i_c$, whose value at $t = t_2$ is adjusted to approximately $2I_s$ by means of resistor $R_{14}$. Also this correction current pulse $i_c$ supplied by branch 12 of output filter 10 in response to a polarity transition of line current $i_1$ at $t = t_2$ is shown at e in FIG. 6.

The line current $i_1$ at b and the correction current pulses $i_c$ at e result in a corrected line current $(i_1 + i_c)$ which is shown at f in FIG. 6 and which is applied in output filter 10 to capacitor $C_1$ parallel with telegraph line 3. contrary to line current $i_1$ which shows abrupt transitions at the instant $t = t_1$ and $t = t_2$, corrected line current $(i_1 + i_c)$ has more gradual transitions with a slowly varying portion for $t_1 < t < t_1 + d$ and $t_2 < t < t_2 + d$ and with a rapidly (in accordance with an exponential function) varying portion from $t = t_1 + d$ and $t = t_2 + d$. The current $i_2$ at the input of telegraph line 3 occurring in response to this corrected line current $(i_1 + i_c)$ is shown at g in FIG. 6.

As above indicated with respect to the prior art transmitter in FIG. 1 especially, the discontinuities of the derivative of current $i_2$ are responsible for the ocrurrence of higher frequencies in the signals at telegraph line 3 and, consequently, for crosstalk to adjacent telephone lines. Now it can be proved that the discontinuities of the derivative of current $i_2$ are proportional to the discontinuities of the current supplied to the parallel combination of capacitor $C_1$ and telegraph line 3. Owing to the fact that this latter current in the transmitter of FIG. 5 is not the line current $i_1$ which has large discontinuities (see b in FIG. 6) but the corrected line current $(i_1 + i_c)$ which even has no discontinuities at all (see f in FIG. 6), the proportion of the higher frequencies in current $i_2$ at the input of telegraph line 3 is considerably smaller for the transmitter of FIG. 5 than for the transmitter in FIG. 1 and, accordingly, the interference level in adjacent telephone lines is lower.

Extensive experiments have proved that by using the described measures in the transmitter of FIG. 5 values of this interference level can be attained which are very close to the values obtained by utilizing known LC-filters. A comparison of the transmitters in FIG. 1 and FIG. 5 for a telegraph speed of 50 Baud, wherein the interference level is determined by means of a posphometer having a weighting curve prescribed by the CCITT may serve as an example. If the interference level for the transmitter in FIG. 1 comprising the above-mentioned LC-filter ($L_1=L_2=1$ H and $C_1=2.2$ μF) is chosen as a reference then an interference level is found for the transmitter in FIG. 5 which is not more than 20% above this reference without adjustment of output filter 10 (considerably lower values than 20% can be achieved by means of adjustment). So the interference level for the transmitter in FIG. 5 stays amply below the value of twice this reference, which value is put down as the upper limit by some telecommunication administrations.

These favorable values of the interference level in adjacent telephone lines are furthermore accompanied by only a slight distortion of the telegraph signals themselves. For the positive and negative correction current pulses $i_c$ are indeed supplied in output filter 10 of FIG. 5 by two different, complementary branches 11 and 12, but otherwise these branches 11, 12 are identical so that only the tolerances of the elements in output filter 10 may result in differences in the shift of the characteristic instants of current $i_2$ (the zero-crossings of $i_2$). It appears, however, that the telegraph distortion caused hereby can be kept below the practically acceptable value of 2% without imposing excessive requirements on the elements in output filter 10, so that it is not necessary to use expensive elements.

As both the number and the size of these elements is small, output filter 10 in FIG. 5 requires little space only. This may be illustrated by the filters used in the above-mentioned comparison of the transmitters in FIG. 1 and FIG. 5: the LC-filter in FIG. 1 has a volume of approximately 500 cm$^3$ and is not suitable for assembly on printed circuit boards, on the contrary output filter 10 in FIG. 5 is well-suited for assembly on printed circuit boards and then requires a surface area of approximately 10 cm$^2$ only for the, in this art, normal structure height of 14 mm. By using the above-described measures in the transmitter of FIG. 5 a very efficient miniaturization of the transmitter in its entirety can therefore be realized. An additional advantage of the described measures is that, different from the LC-filter in FIG. 1, output filter 10 in FIG. 5 does not given an unwanted voltage loss because both the capacitor $C_1$ and the two branches 11, 12 are arranged in parallel with telegraph line 3.

The transmitter of FIG. 5 can alternatively be used in voltage-controlled telegraphy systems and in that case current source 6 is adjusted to a current value $I_s$ of, for example, 50 mA which is so high that in all circumstances the current at the receiving side is determined by the impedance of telegraph line 3 and receiver 2 together. The signal shapes of the voltages and currents then appearing in various points in the transmitter of FIG. 5 are shown in FIG. 7 in the same manner as in FIG. 6, but for the difference that time diagram g of FIG. 7 shows voltage $V_2$ at the input of telegraph line 3 and not current $i_2.c$.

Figure 7:
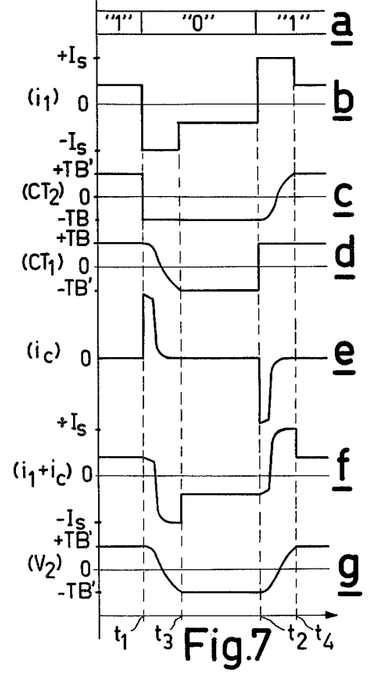

Line current $i_1$ at b in FIG. 7 has the same shape as line current $i_1$ at d in FIG. 4. The voltages $CT_2$ and $CT_1$ at c and d in FIG. 7 differ from those at c and d in FIG. 6, as in voltage-controlled systems the steady-state value TB' of voltage $V_2$ at the input of telegraph line 3 deviates only little from voltage TB of the telegraph battery. Furthermore, the values of the correction current pulses $i_c$ at e in FIG. 7 at the instants $t=t_1$ and $t=t_2$ are again adjusted to approximately the value of the jump in line current $i_1$ at b in FIG. 7 at these instants (these values are not the same as those in current-controlled systems).

Also in this case the proportion of the higher frequencies in voltages $V_2$ at the input of telegraph line 3, and, consequently, the interference level in adjacent telephone lines is smaller for the transmitter in FIG. 5 than for the transmitter in FIG. 1, as also in this case the abrupt transitions of line current $i_1$ at the instants $t=t_1$ and $t=t_2$ do not occur anymore in the corrected line current $(i_1+i_c)$, as shown at f in FIG. 7. On the other hand the abrupt transitions of line current $i_1$ at the instants $t=t_3$ and $t=t_4$, at which voltage $V_2$ attains its steady-state value TB' (see g and b in FIG. 7), are still present in the corrected line current $(i_1+i_c)$, as shown at f in FIG. 7. However, the magnitude of the discontinuities in the derivatives of the voltage $V_2$ at $t=t_3$ and $t=t_4$ (see g in FIG. 7) is much smaller than that at $t=t_1$ and $t=t_2$ without the described correction (see e in FIG. 4), so that when the transmitter of FIG. 5 is used in voltage-controlled telegraphy systems, a considerable reduction of the interference level in adjacent telephone lines is yet attained.

Figure 8:
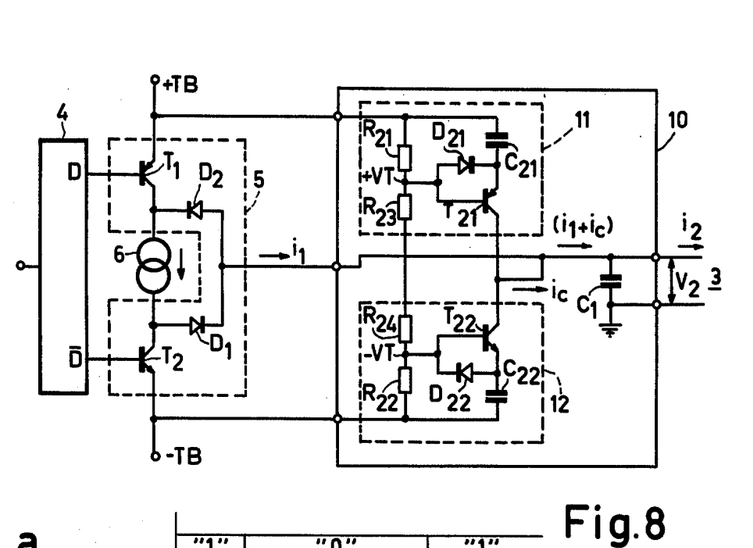
FIG. 8 shows a circuit diagram of a second embodiment of an electronic transmitter according to the invention.

Description of FIG. 8

FIG. 8 shows the circuit diagram of the second embodiment of an electronic telegraph transmitter according to the invention. This second embodiment is particularly arranged for use in voltage-controlled telegraphy systems and furnishes, in that case, results which correspond to the results of the first embodiment of FIG. 5 when used in current-controlled systems. Elements in FIG. 8 which correspond to elements in FIG. 1 have been given the same reference numerals in FIG. 8 as in FIG. 1.

Also in this second embodiment output filter 10 comprises next to a parallel capacitor $C_1$, two complementary branches 11 and 12 in parallel with telegraph line 3. Now, however, each of the two branches 11, 12 is provided with an auxiliary capacitor $C_{21}$, $C_{22}$ and with a switching circuit which receives the input voltage $V_2$ from telegraph line 3 and which connects auxiliary capacitor $C_{21}$, $C_{22}$ to telegraph line 3 only for values of voltage $V_2$ exceeding a threshold voltage VT equal to a given fraction of the prescribed steady-state value TB' of voltage $V_2$ in voltage-controlled telegraphy systems.

In branch 11 of FIG. 8 auxiliary capacitor $C_{21}$ is connected to a positive pole +TB and the switching circuit is formed by a pnp transistor $T_{21}$ having a diode $D_{21}$ between emitter and base of transistor $T_{21}$, the emitter-base diode and diode $D_{21}$ having opposite polarities, the emitter being connected to auxiliary capacitor $C_{21}$ and the collector being connected to telegraph line 3. Likewise auxiliary capacitor $C_{22}$ is connected in branch 12 to a negative pole −TB and the switching circuit is formed by an npn transistor $T_{22}$ having a diode $D_{22}$ between emitter and base of transistor $T_{22}$, the emitter-base diode and diode $D_{22}$ having opposite polarities, the emitter being connected to auxiliary capacitor $C_{22}$ and the collector being connected to telegraph line 3.

As the prescribed steady-state value TB' of voltage $V_2$ and the value TB of the telegraph battery voltage differ only slightly from one another, threshold voltage VT in FIG. 8 is directly derived from the telegraph battery by means of a voltage divider in which resistors $R_{21}$, $R_{23}$, $R_{24}$, $R_{22}$ are arranged in series between positive pole +TB and negative pole −TB. The threshold voltage +VT for the switching circuit of branch 11 is produced at the junction of resistors $R_{21}$, $R_{23}$, which junction is connected to the base of transistor $T_{21}$. Likewise the threshold voltage −VT for the switching circuit of branch 12 is produced at the junction of resistors $R_{22}$, $R_{24}$, which junction is connected to the base of transistor $T_{22}$. For clearness' sake resistors $R_{23}$ and $R_{24}$ are shown in FIG. 8 as separate components, in practice they are, however, combined into one resistor.

Operation of the Transmitter in FIG. 8

The transmitter in FIG. 8 is used in voltage-controlled telegraphy systems and current source 6 is therefore again adjusted to the current value $I_s$ of, for example, 50 mA which value was earlier mentioned for this application. The signal shapes of the voltages and currents then appearing in various points in the transmitter of FIG. 8 are shown schematically in the time diagrams of FIG. 9. It is assumed that threshold voltage VT for the switching circuits of branches 11, 12 of output filter 10 is equal to about 90% of the steady-state value TB′ of voltage $V_2$ at the input of telegraph line 3.

Figure 9:
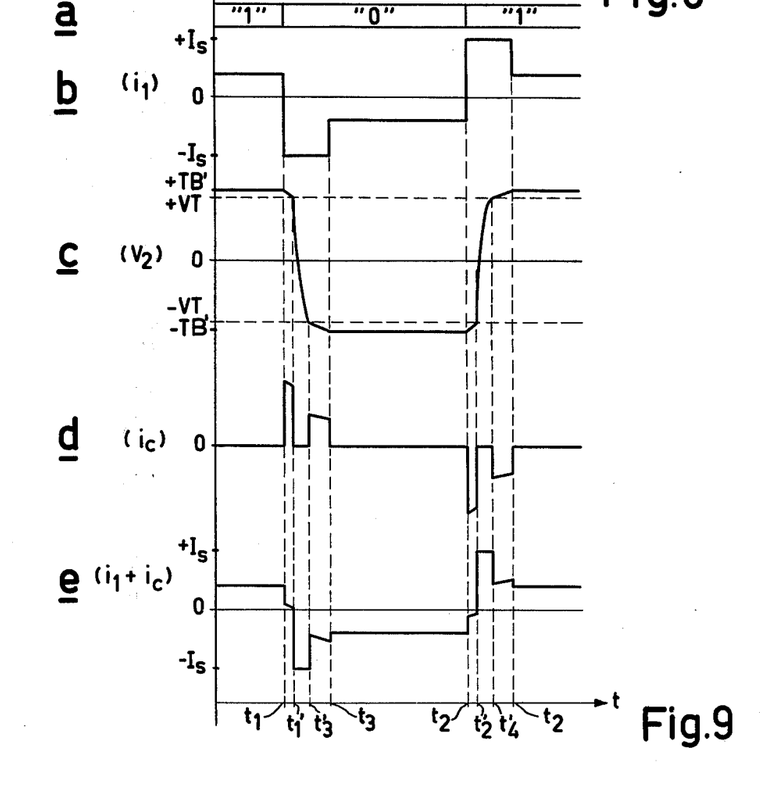
FIG. 9 shows some time diagrams for explaining the operation of the transmitter in FIG. 8.

FIG. 9 shows at a the binary data signals to be transmitted and the polar line current $i_1$ then supplied by current source 6 is shown at b (cf. the time diagrams a and d in FIG. 4). The voltage $V_2$ at the input of telegraph line 3 in response to the corrected line current $(i_1+i_c)$ is shown at c in FIG. 9, the correction current pulses $i_c$ supplied by branches 11, 12 of filter 10 being shown at d and the corrected line current $(i_1+i_c)$ itself, that is to sat the combination of line current $i_1$ at b and the correction current pulses $i_c$ at d, being shown at c.

In the transmitter of FIG. 8 the voltage $V_2$ at the input of telegraph line 3 is used for controlling the switching circuits of branches 11, 12 of output filter 10.

Shortly before the instant $t=t_1$, at which line current $i_1$ changes to its negative maximum value $-I_s$, voltage $V_2$ has its positive steady-state value $+TB′$ which exceeds the positive threshold voltage $+VT$. In branch 11 of filter 10 the collector-base diode of transistor $T_{21}$ and diode $D_{21}$ are then in their conducting state so that auxiliary capacitor $C_{21}$ is then arranged in parallel with capacitor $C_1$ through these conducting diodes and, consequently, also in parallel with telegraph line 3.

As a result of the polarity transition of line current $i_1$ at instant $t=t_1$ capacitor $C_1$ starts discharging and, consequently, voltage $V_2$ starts decreasing so that diode $D_{21}$ immediately arrives in its non-conducting state, but the emitter-base diode of transistor $T_{21}$ starts, on the contrary, to conduct so that auxiliary capacitor $C_{21}$ remains in parallel with telegraph line 3. Shortly after the instant $t=t_1$, the negative line current $i_1=-I_s$ flows to the parallel combination of auxiliary capacitor $C_{21}$, capacitor $C_1$ and telegraph line 3 so that the negative current to the parallel combination of capacitor $C_1$ and telegraph line 3—the corrected line current $(i_1+i_c)$—is then smaller than in the original case, where filter 10 comprises capacitor $C_1$ only and the decrease of voltage $C_2$ consequently takes place with a corresponding greater time constant. This implies that from the instant $t=t_1$ branch 11 of the filter 10 supplies a positive correction $i_c$ at the negative line current $i_1$. This correction continuous until the instant $t=t′_1$, at which voltage $V_2$ decreases to below positive threshold voltage $+VT$ so that the emitter-base diode of transistor $T_{21}$ arrives in its non-conducting state and auxiliary capacitor $C_{21}$ is no longer connected to telegraph line 3.

From this instant $t=t′_1$ the decrease in voltage $V_2$ takes place with the original time constant, that is to say the time constant of the parallel-combination of capacitor $C_1$ and telegraph line 3, and this continues until the instant $t=t′_3$ at which voltage $V_2$ decreases to below negative threshold voltage $-VT$ of branch 12. In branch 12 of filter 10 the collector-base diode of transistor $T_{22}$ and diode $D_{22}$ then arrive in their conducting state so that auxiliary capacitor $C_{22}$ is arranged through these conducting diodes in parallel with the capacitor $C_1$ and telegraph line 3.

From this instant $t=t′_3$, the negative line current $i_1=-I_s$ flows to the parallel combination of auxiliary capacitor $C_{22}$, capacitor $C_1$ and telegraph line 3 so that the negative current through the parallel combination of capacitor $C_1$ and telegraph line 3 is smaller than in the original case and the decrease of voltage $V_2$ takes consequently place with a correspondingly greater time constant. This implies that from the instant $t=t′_3$ branch 12 of filter 10 supplies a positive correction $i_c$ at the negative line current $i_1$. This correction continuous until the instant $t=t_3$ at which voltage $V_2$ attains its negative steady-state value $-TB′$ and line current $i_1$ falls back to its negative steady-state value which, as stated above, is much smaller than the negative maximum value $-I_s$.

In response to the polarity transition of line current $i_1$ at instant $t=t_1$, the first branch 11 of filter 10 consequently supplies a correction current pulse $i_c$ from instant $t=t_1$ until instant $t=t′_1$ and thereafter branch 12 of filter 10 supplies a correction current pulse $i_1$ from instant $t=t′_3$ until instant $t=t_3$, which correction current pulses $i_c$ have both a positive polarity, that is to say a polarity opposite to that of the negative line current $i_1=-I_s$ after instant $t=t_1$. In view of the symmetry of switching circuit 5 and filter 10, the above consideration apply *mutatis mutandis* also to the polarity transition of line current $i_1$ at instant $t=t_2$ and the correction pulses $i_c$ which are supplied as a result of this transition by branch 12 from instant $t=t_2$ until instant $t=t′_2$ and by branch 11 from instant $t=t′_4$ until instant $t=t_4$. The values of the correction current pulses $i_c$ at the instant $t=t_1$ and $t=t_2$ are determined by the ratio of the capacitance of auxiliary capacitors $C_{21}$ and $C_{22}$ to the capacitance of capacitor $C_1$ and these values are adjusted to approximately 80% of the jump in line current $i_1$ at these instants. As a consequence the values of the correction current pulses $i_c$ are then also equal at the instants $t=t_3$ and $t=t_4$ to approximately 80% of the jump in line current $i_1$ at these instants.

The application of the described measures achieves that the magnitude of the discontinuities in the corrected line current $(i_1+i_c)$ at the instant $t=t_1$, $t_3$, $t_2$, $t_4$ and $t=t′_1$, $t′_3$, $t′_2$, $t′_4$ (see e in FIG. 9) is much smaller than that of the discontinuities in line current $i_1$ at the instants $t=t_1$, $t_3$, $t_2$, $t_4$ (see b in FIG. 9). As was earlier explained in great detail, this line current correction results in that the proportion of the higher frequencies in voltage $V_2$ at the input of telegraph line 3 (see c in FIG. 9) is considerably smaller for the transmitter in FIG. 8 than for the transmitter in FIG. 1 and, accordingly, the interference level in adjacent telephone lines is lower.

As regards the interference level in adjacent telephone lines and the distortion of the telegraph signals themselves extensive experiments showed that using the transmitter of FIG. 8 in voltage-controlled telegraphy systems has the same favourable results as using the transmitter of FIG. 5 in current-controlled telegraphy systems.

The considerations about the number, size and price of the elements of Filter 10 in the transmitter of FIG. 5 also apply to the elements of Filter 10 in the transmitter of FIG. 8, so that also in the latter case a very efficient miniaturization of the transmitter in its entirety can be realized.

Remarks

In the transmitter of FIG. 5 the control of auxiliary current sources 13, 14 in output filter 10 is effected by means of voltage jumps which coincide with polarity transitions of line current $i_1$ and which are derived from switching circuit 5. So for controlling auxiliary current source 13 use is made of the negative jump in voltage $CT_2$ at the collector of transistor $T_2$ in switching circuit 5 at instant $t=t_1$ (see c in FIG. 6 and FIG. 7). If the transmitter of FIG. 5 is used in current-controlled telegraphy systems the negative jump in voltage $CT_1$ at the collector of transistor $T_1$ at this instant $t=t_1$ (see d in FIG. 6) can alternatively be used for controlling auxiliary current source 13 instead of the negative jump in voltage $CT_2$ at this instant. However, last mentioned jump is much larger so that the possibility shown in FIG. 5 should be preferred for practical reasons. If the transmitter of FIG. 5 is used in voltage-controlled telegraphy systems the transition of voltage $CT_1$ from instant $t=t_1$ onwards (see d in FIG. 7) can, however, not be used for controlling auxiliary current source 13, because this transition is too gradual for an accurate control so that in that case only the possibility shown in FIG. 5 has any practical sense.

It appears from previous explanation that for using the transmitter of FIG. 5 in current-controlled telegraphy systems the symmetry of current $i_2$ at the input of telegraph line 3 (see g in FIG. 6) is of great importance to prevent telegraphy distortion. If the transistors $T_1$, $T_2$ of switching circuit 5 and the transistors $T_{13}$, $T_{14}$ of output filter 10 are in their non-conducting state, leakage can occur in these transistors owing to the rather high values of the voltages then occurring across these transistors. This leak may cause a small asymmetry of current $i_2$ at the input of telegraph line 3 and, consequently, telegraph distortion.

Figure 10:
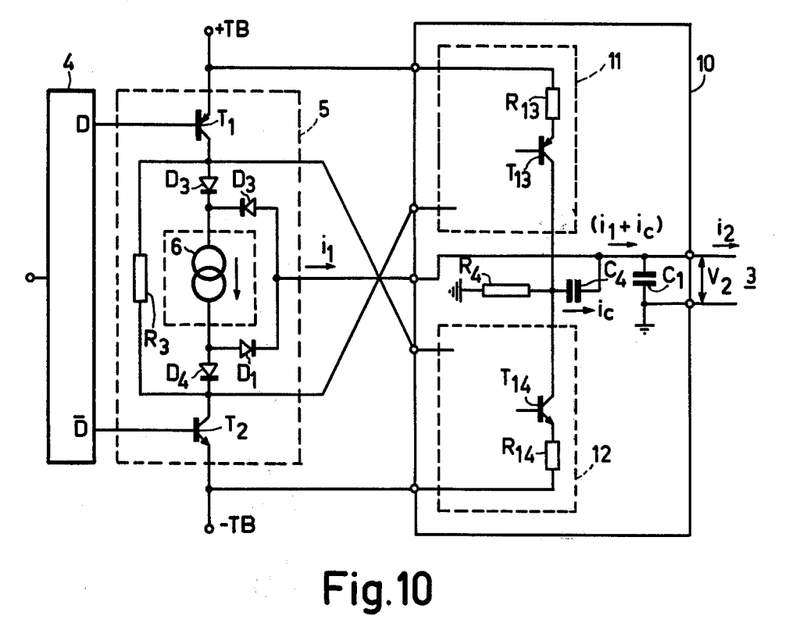
FIG. 10 shows a circuit diagram of a variant of the transmitter in FIG. 5.

FIG. 10 shows a variant of the transmitter of FIG. 5 in which by means of small alterations of switching circuit 5 and output filter 10 any leakage currents in the transistors $T_1$, $T_2$ and $T_{13}$, $T_{14}$ are prevented from penetrating into telegraph line 3. As regards switching circuit 5 in FIG. 10 the alteration consists in providing a diode $D_3$ in the connection from transistor $T_1$ to current source 6 and a diode $D_4$ in the connection from transistor $T_2$ to current source 6, so that any leakage currents in these transistors cannot reach telegraph line 3, and furthermore in providing a resistor $R_3$ of a suitably chosen value between the collectors of transistors $T_1$, $T_2$ through which these leakage currents can flow off. As regards output filter 10 in FIG. 10 the alteration consists in providing a high-value coupling capacitor $C_4$ between the common junction of the (otherwise unchanged) branches 11, 12 and telegraph line 3, and in providing a high-value resistor $R_4$ between this junction and earth so that any leakage currents in the transistors $T_{13}$, $T_{14}$ can flow off without reaching telegraph line 3. In addition, last-mentioned alteration has the advantage that the correction current pulses $i_c$ are now capacitively coupled-in and consequently mutual tolerances of the auxiliary current sources 13, 14 have substantially no influence anymore on the symmetry of current $i_2$ at the input of telegraph line 3.

Figure 11:
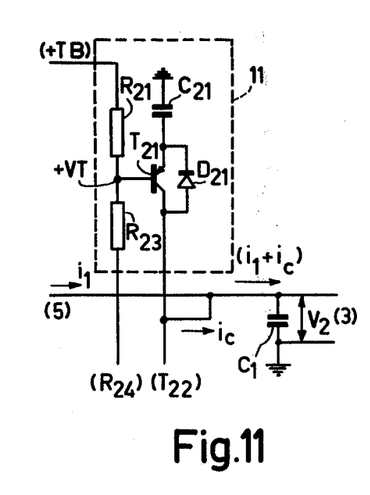
FIG. 11 and FIG. 12 show a circuit diagram of a first and a second variant of a branch in the output filter of the transmitter in FIG. 8.

In the transmitter of FIG. 8 the complementary branches 11, 12 of output filter 10 can also be constructed in a manner different from that of FIG. 8 without essentially affecting the operation of this transmitter, as earlier explained. FIG. 11 shows, by way of illustration, such a variant of branch 11 in output filter 10 of the transmitter shown in FIG. 8. In FIG. 11 auxiliary capacitor $C_{21}$ is directly connected to earth (so without the intermediary of the telegraph battery whose mid point is earthed) and diode $D_{21}$ is provided between emitter and collector of transistor $D_{21}$ (instead of between emitter and base). The values of the voltages which are produced across auxiliary capacitor $C_{21}$ and diode $D_{21}$ in FIG. 11 are, however, much higher than those in the implementation according to FIG. 8, in which latter case these voltages do not become higher than the difference between the telegraph battery voltage TB and the approximately 15% lower threshold voltage VT. The implementation shown in FIG. 8 should therefore be preferred in practice, because less stringent requirements need be imposed on the elements $C_{21}$ and $D_{21}$ than in the implementation in accordance with FIG. 11.

From the previous explanation of the transmitter of FIG. 8 it appears that in the time intervals in which voltage $V_2$ at the input of telegraph line 3 changes from its positive (negative) to its negative (positive) steady-state value, the absolute value of the derivative of voltage $V_2$ is reduced during the sub-intervals in which one of the auxiliary capacitors $C_{21}$, $C_{22}$ of branches 11, 12 in output filter 10 is arranged in parallel with capacitor $C_1$. So in the time intervals ($t_1$, $t_3$) and ($t_2$, $t_4$) at c in FIG. 9 auxiliary capacitor $C_{21}$ in branch 11 is connected in parallel with capacitor $C_1$ during the sub-intervals ($t_1$, $t'_1$) and ($t'_4$, $t_4$), so that the relative reduction of the derivative of $V_2$ in the two sub-intervals is the same. On the contrary, this derivative of $V_2$ in said sub-intervals does not have the same absolute value, as can be proved in a simple manner and may also appear from FIG. 9.

Figure 12:
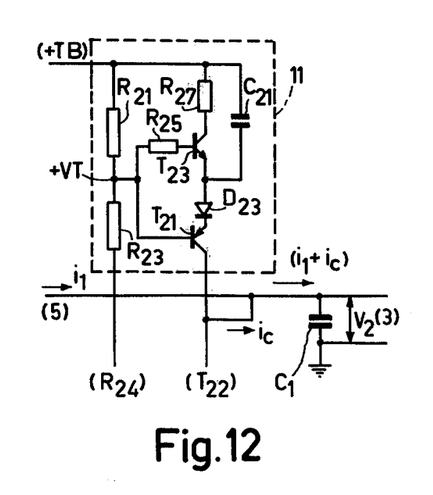

FIG. 12 now shows a variant of branch 11 in output filter 10 of FIG. 8, in which it is achieved by modification of the switching circuit of this branch 11 that the absolute value of the derivative of voltage $V_2$ is substantially the same for the two sub-intervals in which auxiliary capacitor $C_{21}$ is connected to telegraph line 3. The switching circuit of branch 11 shown in FIG. 12 differs from that shown in FIG. 8 in that diode $D_{21}$ of FIG. 8 is replaced by an npn transistor $T_{23}$ whose emitter is connected to auxiliary capacitor $C_{21}$, whose base is connected through a resistor $R_{25}$ to the point in which threshold voltage $+VT$ occurs (the junction of resistors $R_{21}$, $R_{23}$) and whose collector is connected through a resistor $R_{27}$ to positive pole $+TB$. In addition, in FIG. 12 the emitter of transistor $T_{21}$ is connected through a diode $D_{23}$ to auxiliary capacitor $C_{21}$. There is no essential difference in operation between branch 11 of FIG. 8 and branch 11 of FIG. 12 as regards the sub-interval in which voltage $V_2$ decreases from its positive steady-state value $+TB'$ to below the positive threshold voltage $+VT$, that is to say interval ($t_1$, $t'_1$) in FIG. 9. As can be checked in a simple manner, in FIG. 12 the emitter-base diode of transistor $T_{23}$ is then non-conducting, but diode $D_{23}$ and the emitter-base diode of transistor $T_{21}$ are conducting, so that the connecting path between auxiliary capacitor $C_{21}$ and telegraph line 3 is then in practice the same as in FIG. 8, in which diode $D_{21}$ is then nonconducting but the emitter-base diode of transistor $T_{21}$ conducts. In this case branch 11 in FIG. 2 supplies in practice the same correction current pulse $i_c$ as branch 11 in FIG. 8.

On the other hand, there is a difference in operation between branch 11 in FIG. 8 and branch 11 in FIG. 12 as regards the sub-interval in which voltage $V_2$ increases from positive threshold voltage $+VT$ to its positive steady-state value $+TB'$, i.e. for FIG. 8 interval $(t'_4, t_4)$ in FIG. 9. If in FIG. 12 voltage $V_2$ exceeds threshold voltage $+VT$ the collector-base diode of transistor $T_{21}$ and the emitter-base diode of transistor $T_{23}$ arrive in their conducting state (diode $D_{23}$ and the emitter-base diode of transistor $T_{21}$ remain non-conducting). Between auxiliary capacitor $C_{21}$ and telegraph line 3, there is then created a connecting path comprising a conducting diode and a conducting transistor $T_{23}$ and thus not just two conducting diodes, as in FIG. 8. Different from FIG. 8, in which the correction current $i_c$ is equal to the current through auxiliary capacitor $C_{21}$, the correction current $i_c$ in FIG. 12 is equal to the base current of transistor $T_{23}$ and therefore much smaller than the current through auxiliary capacitor $C_{21}$ which is equal to the emitter current of transistor $T_{23}$. This implies that for the correction current $i_c$ supplied to telegraph line 3 an attenuation occurs in the connecting path discussed so that in the relevant sub-interval the corrected line current $(i_1+i_c)$ for FIG. 12 is larger than for FIG. 8 and as a result voltage $V_2$ will reach its positive steady-state value $+TB'$ more rapidly. By means of the resistors $R_{25}$, $R_{27}$ the ratio base current to emitter current of transistor $T_{23}$ is adjusted so that the absolute value of the derivative of voltage $V_2$ is in practice equal for the two sub-intervals in which auxiliary capacitor $C_{21}$ is connected to telegraph line 3.

The modification of branch 11 in output filter 10 of FIG. 8 as shown in FIG. 12 can be effected in a corresponding manner in complementary branch 12 of this filter 10. Such a modification results in a transmitter having an additional adjustment feature of the branches 11, 12 in output filter 10 (more specifically the feature described for branch 11 in FIG. 12 to change the mutual ratio of the resistors $R_{25}$, $R_{27}$) and therefore offers the advantage that the desired degree of symmetry of voltage $V_2$ at the input of telegraph line 3 can be obtained for a wider range of telegraph line impedances than when the transmitter of FIG. 8 is used.

What is claimed is:

1. An electronic transmitter for direct current telegraphy systems in which binary data signals are converted into polar line currents for transmission over a telegraph line, the transmitter comprising an input circuit means for generating command signals from the data signals which are galvanically isolated therefrom, a telegraph voltage source having a positive and a negative pole, a unipolar constant current source, a switching circuit means controlled by the command signals for selectively connecting one of the two poles of the telegraph voltage source to the telegraph line through the unipolar constant current source, and an output filter having a capacitor in parallel with the telegraph line, the output filter comprising two complementary branches in parallel with the telegraph line, at least one of the two branches comprising means operating in response to a polarity transition of the line current supplied by the current source means for supplying a correction current pulse of a polarity opposite to the line current to the telegraph line.

2. An electronic transmitter as claimed in claim 1, wherein each of the two complementary branches of the output filter comprises a controllable auxiliary current source means for supplying correction current pulses and a control circuit means for deriving from the switching circuit a voltage jump coinciding with the polarity transition of the line current and comprising a differentiating network and a limiter means for supplying a limited differentiated voltage jump as a control pulse for the auxiliary current source.

3. An electronic transmitter for direct current telegraphy systems having prescribed steady-state values of the input voltage of the telegraph line as claimed in claim 1, wherein each of the two complementary branches comprises an auxiliary capacitor and a switching circuit means receiving the input voltage of the telegraph line for connecting the auxiliary capacitor to the telegraph line only for values of this input voltage exceeding a threshold voltage equal to a given fraction of the prescribed steady-state value.

4. An electronic transmitter as claimed in claim 3, wherein the switching circuit means of each of the two complementary branches comprises a first connecting path for input voltages increasing from the threshold voltage and a second connecting path for input voltages decreasing from the prescribed steady-state value, the first connecting path comprising a circuit means for attenuating the correction current pulse to be supplied to the telegraph line.

* * * * *